United States Patent
Chowdhary

(10) Patent No.: US 6,360,165 B1
(45) Date of Patent: Mar. 19, 2002

(54) METHOD AND APPARATUS FOR IMPROVING DEAD RECKONING DISTANCE CALCULATION IN VEHICLE NAVIGATION SYSTEM

(75) Inventor: Mahesh Chowdhary, San Jose, CA (US)

(73) Assignee: Visteon Technologies, LLC, Dearborn, MI (US)

( * ) Notice: Subject to any disclaimer, the term of this patent is extended or adjusted under 35 U.S.C. 154(b) by 0 days.

(21) Appl. No.: 09/422,830

(22) Filed: Oct. 21, 1999

(51) Int. Cl.⁷ ................................. G06F 7/00
(52) U.S. Cl. ........................ 701/205; 701/213
(58) Field of Search ................ 701/200, 201, 701/205, 206, 207, 213; 702/85, 97; 73/178 R; 33/700, 772

(56) References Cited

U.S. PATENT DOCUMENTS

| | | |
|---|---|---|
| 3,845,289 A | 10/1974 | Franch |
| 4,139,889 A | 2/1979 | Ingels |
| 4,570,227 A | 2/1986 | Tachi et al. |
| 4,608,656 A | 8/1986 | Tanaka et al. |
| 4,611,293 A | 9/1986 | Hatch et al. |
| 4,672,565 A | 6/1987 | Kuno et al. |
| 4,673,878 A | 6/1987 | Tsushima et al. |
| 4,723,218 A | 2/1988 | Hasebe et al. |
| 4,734,863 A | 3/1988 | Honey et al. |
| 4,751,512 A | 6/1988 | Longaker |
| 4,782,447 A | 11/1988 | Ueno et al. |
| 4,796,191 A | 1/1989 | Honey et al. |
| 4,797,841 A | 1/1989 | Hatch |
| 4,831,563 A | 5/1989 | Ando et al. |
| 4,862,398 A | 8/1989 | Shimizu et al. |
| 4,903,212 A | 2/1990 | Yokouchi et al. |
| 4,914,605 A | 4/1990 | Loughmiller, Jr. et al. |
| 4,918,609 A | 4/1990 | Yamawaki |
| 4,926,336 A | 5/1990 | Yamada |

(List continued on next page.)

FOREIGN PATENT DOCUMENTS

| | | |
|---|---|---|
| EP | 0 485 120 A2 | 5/1992 |
| EP | 0527558 A1 | 2/1993 |
| EP | 0544403 A1 | 6/1993 |
| EP | 0 575 943 1 | 12/1993 |
| GB | 2 271 423 A | 4/1994 |
| JP | 2107985 | 4/1990 |

OTHER PUBLICATIONS

French, *MAP matching Origins Approaches and Applications*, Rober L. French & Associates, 3815 Lisbon St., Suite 201, Fort Worth, Texas 76107, USA, pp. 91–116.

Primary Examiner—William A. Cuchlinski, Jr.
Assistant Examiner—Edward Pipala
(74) Attorney, Agent, or Firm—Beyer, Weaver & Thomas,LLP

(57) ABSTRACT

The present invention enables a vehicle navigation system to automatically compensate for odometer measurement errors due to changes in tire size and/or slip, and to avoid odometer recalibration when slip is present. These capabilities improve the accuracy and reliability of the vehicle navigation system. Slip of a vehicle, e.g., a loss of traction, can occur when a road is wet or covered with snow or ice. It can occur when a road is dry, and a vehicle is accelerating or decelerating rapidly. It can occur rounding a sharp corner. Because an odometer is typically hooked up to a driven wheel, the engine or transmission, there may be large sources of error in the distance estimates derived from the odometer. Utilizing conveniently derived slip signals from an anti-lock brake system (ABS) or from a traction control system (TCS), the slip of the vehicle can be accounted for, even absent a GPS signal to recalibrate the system. This allows for improved accuracy of the system which is particularly noticeable in urban environments where GPS signals may not be available.

12 Claims, 5 Drawing Sheets

U.S. PATENT DOCUMENTS

| | | |
|---|---|---|
| 4,937,753 A | 6/1990 | Yamada |
| 4,964,052 A | 10/1990 | Ohe |
| 4,970,652 A | 11/1990 | Nagashima |
| 4,982,332 A | 1/1991 | Saito et al. |
| 4,984,168 A | 1/1991 | Neukrichner et al. |
| 4,989,151 A | 1/1991 | Nuimura |
| 4,992,947 A | 2/1991 | Nimura et al. |
| 4,996,645 A | 2/1991 | Schneyderberg Van DerZon |
| 4,999,783 A | 3/1991 | Tenmoku et al. |
| 5,040,122 A | 8/1991 | Neukirchner et al. |
| 5,046,011 A | 9/1991 | Kakihara et al. |
| 5,060,162 A | 10/1991 | Ueyama et al. |
| 5,067,579 A | 11/1991 | Kushi et al. |
| 5,119,301 A | 6/1992 | Shimizu et al. |
| 5,148,884 A | 9/1992 | Tsuyama et al. |
| 5,177,685 A | 1/1993 | Davis et al. |
| 5,179,519 A | 1/1993 | Adachi et al. |
| 5,220,509 A | 6/1993 | Takemura et al. |
| 5,241,478 A | 8/1993 | Inoue et al. |
| 5,272,638 A | 12/1993 | Martin et al. |
| 5,283,743 A | 2/1994 | Odagawa |
| 5,287,297 A | 2/1994 | Ihara et al. |
| 5,293,318 A | 3/1994 | Fukushima |
| 5,297,050 A | 3/1994 | Ichimura et al. |
| 5,323,152 A | 6/1994 | Morita |
| 5,369,588 A | 11/1994 | Hayami et al. |
| 5,374,933 A | 12/1994 | Kao |
| 5,410,485 A | 4/1995 | Ichikawa |
| 5,412,573 A | 5/1995 | Barnea et al. |
| 5,416,712 A | 5/1995 | Geier et al. |
| 5,422,639 A | 6/1995 | Kobayashi et al. |
| 5,434,788 A | 7/1995 | Seymour et al. |
| 5,463,554 A | 10/1995 | Araki et al. |
| 5,486,822 A | 1/1996 | Tenmoku et al. |
| 5,506,774 A | 4/1996 | Nobe et al. |
| 5,513,110 A | 4/1996 | Fujita et al. |
| 5,519,619 A | 5/1996 | Seda |
| 5,521,826 A | 5/1996 | Matsumoto |
| 5,550,538 A | 8/1996 | Fujii et al. |
| 5,862,511 A | 1/1999 | Croyle et al. |
| 5,898,390 A | 4/1999 | Oshizawa et al. |
| 5,912,635 A | 6/1999 | Oshizawa et al. |

METHOD AND APPARATUS FOR IMPROVING DEAD RECKONING DISTANCE CALCULATION IN VEHICLE NAVIGATION SYSTEM

BACKGROUND OF THE INVENTION

Field of Invention

The present invention relates generally to vehicle navigation systems. More specifically, the invention relates to methods and apparatus which provide on-the-fly calibration of readings from a vehicle's odometer sensor to ensure accurate determination of the vehicle's position by the navigation system.

Current vehicular navigation systems are hybrids which utilize several independent position determining means to locate a vehicle. The position determining means include: global positioning system satellites (GPS), dead reckoning systems, and map databases. Typically, one among these systems will serve the primary navigation system function while the remaining determining means are utilized to recalibrate cumulative errors in the primary system. Each determining means has its advantages and limitations.

GPS is an electromagnetic wave positioning system utilized to determine a vehicle's position. GPS includes Navstar GPS and its successors, i.e., differential GPS (DGPS), WAAS, or any other electromagnetic wave positioning system. Navstar is a GPS system which uses space-based satellite radio navigation developed by the U.S. Department of Defense. Navstar GPS receivers provide users with continuous three-dimensional position, velocity and time data. Navstar GPS consists of three major segments: space, control, and end-user segments. The space segment consists of a constellation of 24 operational satellites placed in six orbital planes above the Earth's surface. The satellites are in circular orbits and in such an orientation as to normally provide a GPS user with a minimum of five satellites in view from any point on earth at any one time. The satellite broadcasts an RF signal, which is modulated by a precise ranging signal and a coarse acquisition code ranging signal to provide navigation data. This navigation data, which is computed and controlled by the GPS control segment for all GPS satellites, includes the satellite's time, clock correction and ephemeris parameters, almanac and health status. The user segment is a collection of GPS receivers and their support equipment, such as antennas and processors, which allow users to receive the code and process information necessary to obtain position, velocity and timing measurements. There are two primary disadvantages to GPS positioning as it pertains to vehicular navigation. First, errors are imposed on the portion of the GPS signals accessible to civilians. The government imposes position errors in the range of 100 meters. In urban environments, this can result in inadequate navigation capabilities due to the close proximity of streets, some of which are spaced apart by less than 100 meters. The second disadvantage of GPS is that when the user is in urban environments with many scattering objects, such as buildings, it may not be possible to receive information from enough satellites to make an adequate position determination. Even where enough satellites are present, the presence of multipath errors due to the multiple reflections of the satellite signals from buildings, etc., may prevent adequate positioning on the basis of GPS alone. For this reason, GPS is typically utilized in a hybrid navigation system with other position determining means, such as dead reckoning and map databases.

Prior systems use a road network stored in a map database to calculate current vehicle positions. These systems send distance and heading information derived from either GPS or dead reckoning to perform map matching. Map matching calculates the current position based on the road network stored in the database and the input position and heading data. These systems also use map matching to calibrate sensors. The map matching, however, has inaccuracies due to map errors as well as inherent inaccuracies resulting from the fact that map matching must look back in time and match data to a location. As such, map matching can only calibrate the sensors or serve as a position determining means when an absolute position is identified on the map. However, on a long, straight stretch of highway, sensor calibration or position determination using map matching may not occur for a significant period of time.

Current land-based dead reckoning systems use vehicle speed sensors, rate gyros, reverse gear hookups, and wheel sensors to "dead reckon" the vehicle position from a previously known position. It is evident that the accuracy of the data received from these various sensors is essential to the reliable determination of the vehicle's position.

The accuracy of data received from a vehicle's odometer is influenced by a number of factors, including wheel size and pulse rate. An odometer typically detects wheel revolutions as representative of traveled distance, the tire size is directly related to the accuracy of the reported travel distance. For current navigation Systems, once the vehicle's tire size is known, it can be manually programmed into the navigation system to properly correlate wheel revolutions to traveled distance. However, it is well known that the size of a vehicle's tires change over time as they wear down from contact with the road. Moreover, factors such as the air pressure of the tires and the weight loaded on the vehicle at any given time produce variation in travel distances reported by the odometer. The tire size may be periodically reprogrammed into the system to account for such variations, but this is obviously impractical in that a difficult manual reprogramming would frequently be required, possibly every time the navigation system is used.

Another potential source of error in measured distance reported by an odometer is a mismatch between the odometer's pulse rate and the pulse rate setting of the navigation system. Odometers generate a pulse train in which a specific number of pulses (e.g., 2000) represent a unit distance (e.g., a mile). For example, Nissan vehicles employ a pulse rate of 2000 pulses/mile while Ford vehicles employ a pulse rate of 8000 pulses/mile. Therefore, each navigation system must be configured to correspond to the type of vehicle in which it is installed, otherwise very large-scale errors may result. If, for example, the pulse rate setting in a navigation system installed in a Ford corresponded to the pulse rate of a Nissan, an error factor of four would be introduced. The pulse rate setting is typically done before a navigation system is installed and is difficult to change where, for example, the odometer in the vehicle is changed, or the navigation system is installed in a different vehicle. Thus, while detection of the error may be elementary, correction of the error remains problematic.

U.S. Pat. No. 5,898,390 entitled *"Method and Apparatus for Calibration of a Distance Sensor in a Vehicle Navigation System"* discloses a method and apparatus for modifying an odometer reading to compensate for odometer errors resulting from pulse rate and tire size. The method and apparatus provides for correction of a first distance estimate derived from the odometer reading with a second distance estimate, typically produced by an external navigation system, i.e., GPS. Additionally, the pulse rate setting may be adjusted so as to reduce deviations between the first and second distance estimates. If pulse rate settings and tire size were the only significant sources of odometer error, the teachings of the '390 patent would allow the production of a reliable navigation system. However, there are other far more significant sources of odometer error which the '390 patent fails to account for, as will be discussed shortly. This failing is particularly critical in urban environments where scattering objects, such as buildings, reduce the possibility of frequent GPS initiated recalibration of the odometer based distance estimates. Absent these recalibrations, the other far more significant sources of odometer error will result in unacceptable cumulative errors in the odometer distance estimate during intervals in which GPS recalibration is not possible.

What is needed, therefore, is a method and apparatus for removing error from an odometer distance estimate in a vehicle navigation system.

SUMMARY OF THE INVENTION

The present invention enables a vehicle navigation system to automatically compensate for odometer measurement errors due to changes in tire size and/or slip, and to avoid odometer recalibration when slip is present. These capabilities improve the accuracy and reliability of the vehicle navigation system. Slip of a vehicle, e.g., a loss of traction, can occur when a road is wet or covered with snow or ice. It can occur when a road is dry and a vehicle is accelerating or decelerating rapidly. It can also occur rounding a sharp corner. Because an odometer is typically hooked up to a driven wheel, the engine or transmission, there may be large sources of error in the distance estimates derived from the odometer. Utilizing conveniently derived slip signals from an anti-lock brake system (ABS) or from a traction control system (TCS), the slip of the vehicle can be accounted for, even absent a GPS signal to recalibrate the system. This allows for improved accuracy of the system, which is particularly noticeable in urban environments where GPS signals may not be available.

In an embodiment of the invention, an apparatus for correcting odometer error in a vehicle is disclosed. The apparatus includes an odometer, a slip sensor and a first and second logic. The odometer generates an odometer indication signal indicative of a distance traveled by the vehicle. The slip sensor generates a slip indication signal indicative of a slip of the vehicle. The first logic couples to the slip sensor and the odometer to combine the slip indication signal and the odometer indication signal with a conversion parameter to form an odometer distance estimate. The second logic adjusts the odometer distance estimate with values representative of the slip indication signal to form an adjusted odometer distance estimate corresponding to the distance traveled by the vehicle during the first time interval.

In an embodiment of the invention, a vehicle navigation system is disclosed. The navigation system includes: an odometer, a slip sensor, a heading sensor, a radio navigation sensor, and a first and second logic. The odometer generates an odometer indication signal indicative of a distance traveled by the vehicle. The slip sensor generates a slip indication signal indicative of a slip of the vehicle. The heading sensor generates a heading indication signal indicative of the heading of the vehicle. The first logic converts the odometer indication signal to a first distance estimate utilizing an odometer conversion parameter. Additionally, the first logic determines a position of the vehicle based on a known prior position, the first distance estimate and the heading of the vehicle, indications of which are obtained from said heading sensor. The radio navigation sensor receives radio navigation signals. The second logic converts the radio navigation signals to an external distance estimate for the vehicle and determines whether the external distance estimate includes indicia of reliability. If the external distance estimate includes indicia of reliability, the odometer conversion parameter utilized by the first logic is adjusted.

In another embodiment of the invention, a method for determining distance traveled by a vehicle is disclosed. The method comprises the acts of:

obtaining during a first time interval an odometer indication signal and a slip indication signal;

combining a value representative of the odometer indication signal with a conversion parameter to form an odometer distance estimate; and adjusting the odometer distance estimate with values representative of the slip indication signal to form an adjusted odometer distance estimate corresponding to the distance traveled by the vehicle during the first time interval.

In still another embodiment of the invention, a method for navigating a vehicle is disclosed. The method for navigating comprises the acts of:

obtaining during a first time interval an odometer indication signal indicative of a distance traveled by the vehicle, a slip indication signal indicative of the slip of the vehicle, and a heading indication signal indicative of the heading of the vehicle;

converting the odometer indication signal to a first distance estimate;

determining a position of the vehicle based on a known prior position, the first distance estimate obtained during said act of converting, and the heading of the vehicle, indications of which are obtained during said first act of obtaining;

obtaining during the first time interval an external distance estimate for the vehicle from a radio navigation system;

determining whether the external distance estimate includes indicia of reliability; and adjusting an odometer conversion parameter utilized in said act of converting if the external distance estimate includes indicia of reliability as determined in said second act of determining.

A further understanding of the nature and advantages of the present invention may be realized by reference to the remaining portions of the specification and the drawings.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

The present invention enables a vehicle navigation system to automatically compensate for odometer measurement errors due to changes in tire size and/or slip, and to avoid odometer recalibration when slip is present. These capabilities improve the accuracy and reliability of the vehicle navigation system. Slip of a vehicle, e.g., a loss of traction, can occur when a road is wet or covered with snow or ice. It can occur when a road is dry, and a vehicle is accelerating or decelerating rapidly. It can also occur rounding a sharp corner. Because an odometer is typically hooked up to a driven wheel, the engine or transmission, there may be large sources of error in the distance estimates derived from the odometer. Utilizing conveniently derived slip signals from an anti-lock brake system (ABS) or from a traction control system (TCS), the slip of the vehicle can be accounted for, even absent a GPS signal to recalibrate the system. This allows for improved accuracy of the system, which is particularly noticeable in urban environments where GPS signals may not be available.

Figure 1:
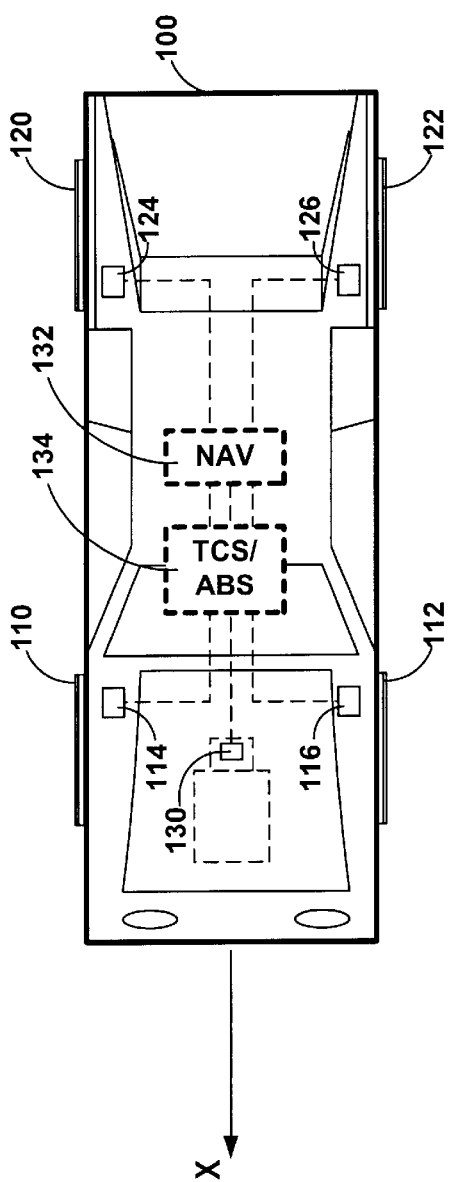
FIG. 1 is a plan view of a vehicle.

FIG. 1 shows a top-plan view of an automobile 100. The automobile has front wheels 110–112 and rear wheels 120–122. The automobile includes a vehicle navigation module 132 and a traction control system (TCS) and/or an anti-lock brake system (ABS) module 134. The TCS/ABS module utilizes information received from front and rear wheel sensors 114–116, 124–126, respectively, to control the acceleration and deceleration of the vehicle in a manner which minimizes slip. Slip may occur under any road conditions: wet/dry, inclined/level, and snow/ice. Acceleration or deceleration of the vehicle may induce slip. ABS and TCS work generally to control deviations in the rotational rate of driven and non-driven wheels. During the course of regulating vehicle behavior, the TCS/ABS modules generate a slip signal. The slip signal corresponds to the relative rotational rates of driven and non-driven wheels. The signal may include a number of parameters, e.g., average front wheel speed, average rear wheel speed, etc. This signal from the TCS/ABS module or an alternate source provides an input to the navigation module 132. The navigation module also receives input from a distance sensor 130. In the embodiment shown, the distance sensor is an odometer. The odometer is typically coupled to the drive train at the engine, transmission, differential, or wheels.

Figure 2:
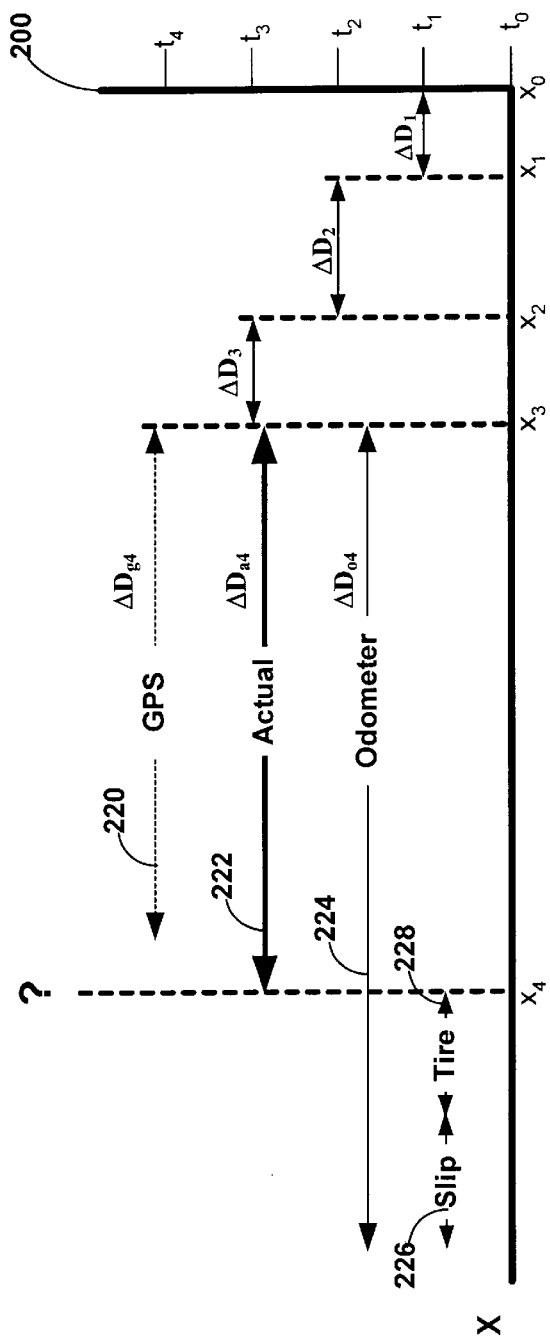
FIG. 2 is a graph showing actual and sensed distances utilized to iteratively calculate vehicle position according to the current invention.

FIG. 2 is a graph showing the iterative process by which vehicle navigation is accomplished. The graph shows the successive approximations of vehicle position $x_0$–$x_4$ at times $t_0$–$t_4$. Linear motion of the vehicle along the X axis is assumed for the sake of simplicity. As will be obvious to those skilled in the art, a complete navigation system will provide similar iterative processes for estimating vehicle heading. Starting from an initial position $x_0$, successive estimates $x_0$–$x_4$ of vehicle position are made at times $t_0$–$t_4$ using estimates of distance traveled $\Delta D_1$–$\Delta D_4$ in each of the time intervals $t_0$–$t_1$, $t_1$–$t_2$, $t_2$–$t_3$, $t_3$–$t_4$. In any interval, preferably independent, multiple estimates of both the distances traveled and heading changes of the vehicle over the sampling interval are obtained. These may be derived from sources such as dead reckoning sensors (e.g., gyros, accelerometers) and GPS, for example. Other radio navigation systems than GPS may be utilized, including ground or satellite based signal sources. Each sensor contains errors both fixed and variable. In the example shown in FIG. 2, the vehicle position at time $t_3$ is $x_3$. There are several varying estimates 220 and 224 from, respectively, a GPS system and an odometer of the actual distance 222 traveled $\Delta D_{a4}$ over the time interval $t_3$–$t_4$. The GPS estimate $\Delta D_{g4}$ falls short of the actual distance traveled. The odometer estimate $\Delta D_{o4}$ exceeds the actual distance traveled. There are two sources of odometer error over the sampling interval. Slip or tire size can cause under/over estimates of distance traveled from the odometer. In the example shown, slip and tire size both contribute to an overestimate, respectively, 226–228 of distance traveled from the odometer. In any given sampling interval, some estimates may be more reliable than others. The vehicle navigation system of the current invention uses a slip signal to improve the dead reckoning distance estimate from the odometer, as well as to avoid recalibration of the odometer (See FIGS. 4–5) when slip exceeds acceptable levels. By improving the accuracy of the primary distance-measuring device, e.g., the odometer, the overall accuracy of the navigation system of which it is a part is improved.

Figure 3:
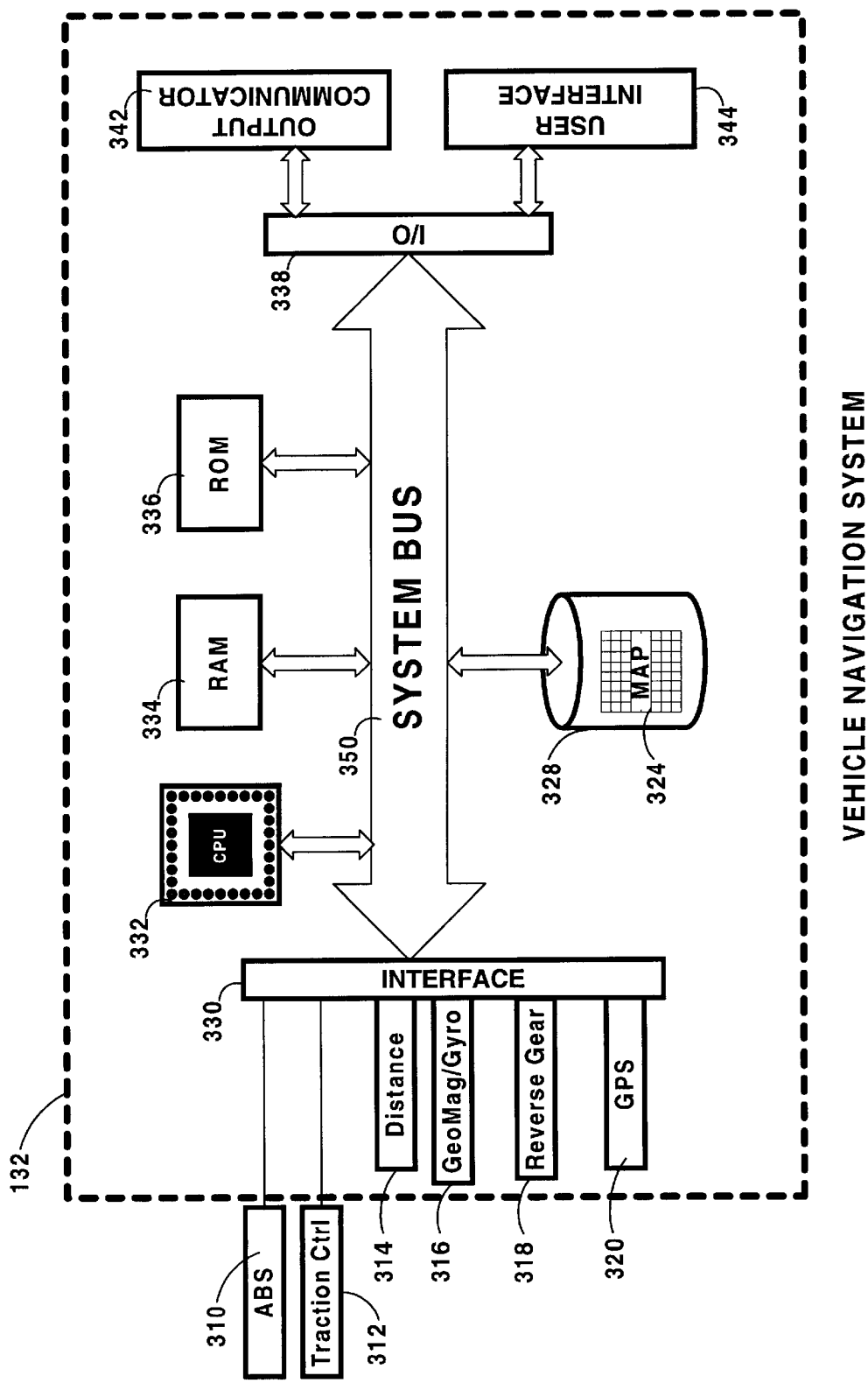
FIG. 3 is a hardware block diagram of an embodiment of a hybrid vehicle navigation system that implements the current invention.

FIG. 3 is a hardware block diagram of the components of a hybrid embodiment of the vehicular navigation system. The anti-lock brake system (ABS) 310 and the traction control system (TCS) 312 are shown coupled to the hybrid navigation system 132. The hybrid navigation system contains dead reckoning sensors 314–318, a distance sensor, a geomagnetic sensor or gyro, and a reverse gear sensor. In an embodiment of the invention, the distance sensor is an odometer coupled to one of: the engine, the transmission, the drive train, or the wheels of the vehicle. The geomagnetic sensor is a compass which measures the compass heading of the vehicle and forms a sensor signal corresponding thereto. Additionally, a GPS module 320 is shown. All of the sensors are coupled via an interface 330 to the system bus 350. CPU 332, RAM 334, ROM 336, main memory 328, and the I/O interface 338 are also shown coupled to the system bus. The output communicator 342 and the user interface 344 are shown coupled to the I/O interface 338.

The GPS module 320 receives signals from, for example, a satellite-based navigation system. Data from the dead reckoning sensors 314–318, as well as the GPS module, is transmitted to the CPU 332 which performs the processes described and discussed in connection with the following FIGS. 4–6. The main memory 328 contains a map database 324, as well as an associative program code for implementing map matching and GPS positioning as well as dead reckoning in accordance with the processes discussed in the following FIGS. 4–6. RAM 334 permits the reading and writing of the information necessary to execute such software programs. ROM 336 may contain the system BIOS. I/O interface 338 receives data processed by CPU 332 and transmits the data to output communicator 342 for presentment to the user as audio, video, text, or any combination thereof. The user may input data such as desired destination through user interface 344, which may be a keyboard or voice recognition system.

The map database 324 stored in main memory 328, may comprise positional data such as latitude and longitude coordinates to describe road intersections or nodes, road segments, landmarks and points of interest, and other geographical information. The database may further comprise data representing characteristics of roads or places on the map, such as road and place names, road features such as dividers, one-way restrictions, surface speed limit, shape, elevation and other properties. Additionally, the map database may include the cost values associative with individual nodes and road segments. These cost values might record estimates of time intervals for traversing the respective node or segments. Segment cost may reflect road characteristics such as speed limit or segment length, both of which affect travel time along the segment. Additionally, the database may include road rank values which relate to the category or type of road: alley, city street, country road, freeway, etc.

Figure 4:
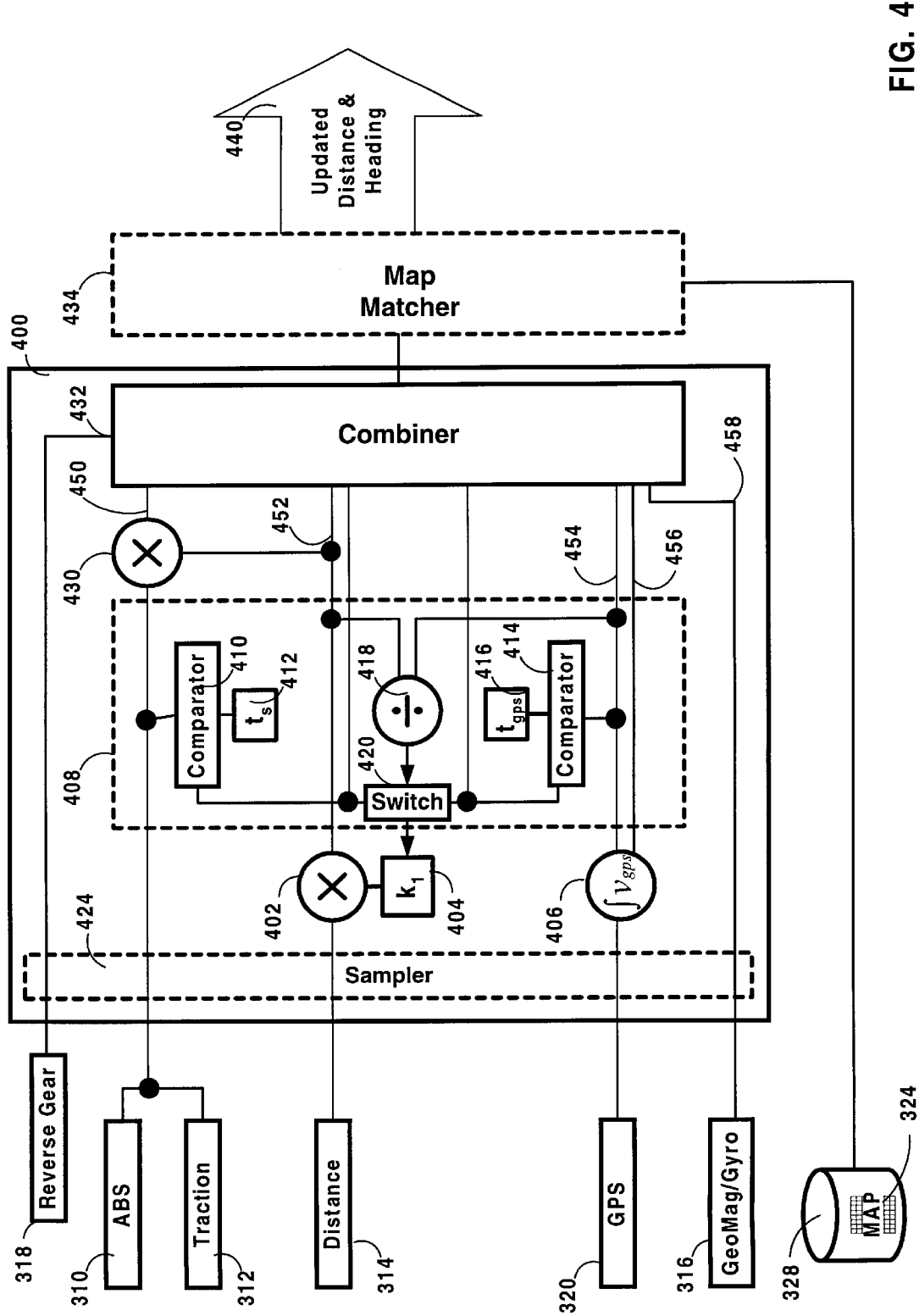
FIG. 4 is a combined hardware/software block diagram showing a detailed view of the logic associated with the recalibration of the odometer.

FIG. 4 is a software/hardware block diagram showing a detailed embodiment of the hybrid GPS/dead reckoning module 400 with logic for correcting odometer error, including error due to slip. The logic/processes disclosed herein may be implemented on the hardware discussed above in connection with FIG. 3. The hybrid GPS/dead reckoning module accepts input from dead reckoning sensors including distance sensor 314, reverse gear 318 and geomagnetic sensor or gyro 316. The hybrid module also accepts inputs from other sources including GPS module 320, ABS 310, and TCS 312. The output of the dead reckoning/inertial-guidance module 400 provides an input to the optional map matching logic/processes 434 (See FIG. 6) which, in turn, provide the updated distance and heading information 440 for the system/user. The dead reckoning and inertial guidance module 400 includes a multiplier 402, a register 404, an integrator 406, a calibration unit 408, a sampler 424, a multiplier 430, and a combiner 432. The calibration unit 408 includes a slip comparator 410, a slip threshold register 412, a GPS comparator 414, a GPS threshold register 416, a divider 418 and a switch 420.

In the embodiment shown, the distance sensor 314, in this instance an odometer, provides an odometer signal proportionate to the number of rotations of the drive train member (e.g., transmission, drive shaft, or wheel) to which the odometer is coupled. That signal is sampled in sampler 424 and passed to multiplier 402 where it is multiplied by an odometer conversion parameter k1 stored in register 404. The conversion factor converts the odometer signal into an estimated distance traveled. The output of the multiplier, i.e., the odometer derived estimate of distance traveled by the vehicle during the sampling interval, is passed to combiner 432. In the embodiment shown, the ABS and/or traction control module generates a slip signal proportionate to the ratio of the free (non-driven)/driven wheel speed. The slip signal may be generated in analog or digital format and may be subject to sampling in sampler 424. In an embodiment of the invention the slip signal is computed (digitally) on ABS/TCS module and is supplied to navigation systems via Serial Communication Protocol bus (SCP bus) or Intelligent Transportation System data bus (IDB) or Controller Area Network bus (CAN bus). This signal is provided as an input to multiplier 430. The other input to multiplier 430 is the above-discussed odometer derived estimate of distance traveled on signal line 452. The slip corrected odometer output is provided as an input to the combiner 432. The GPS module 320 provides a velocity vector for the vehicle which contains both distance and heading information. The sampled GPS signal is integrated by integrator 406 over the sampling interval to produce a GPS distance and heading estimate to the combiner 432 via, respectively, signal lines 454–456. The geomagnetic sensor or gyro provides a signal corresponding to the heading of the vehicle to the sampler 424. This sampled heading signal is provided via signal line 458 to the combiner 432. In an alternate embodiment of the invention data processing is implemented in analog rather than digital format.

The combiner thus receives multiple independent estimates of distance on signal lines 450–454 and of heading on signal lines 456–458. The combiner iteratively provides updated estimates of changes in the vehicle's distance and heading, utilizing the most reliable of the input signals or combinations thereof These are provided to the map matching module 434. The processes implemented in the combiner for producing updated estimates of distance traveled by the vehicle are set forth in the following FIG. 5.

Up to this point, the operation of the calibration unit 408 has not been discussed. That unit provides input to the register 404, which results in the modification of the odometer conversion parameter. Odometer derived distance estimates are sensitive to minor changes in the magnitude of the odometer conversion parameter. For this reason, it is necessary that the conversion parameter only be modified under controlled conditions. Those controlled conditions include a reliable alternative distance estimate which occurs during an interval in which slip of the vehicle is below an acceptable threshold. This objective is achieved by the logic shown within estimator 408. The slip and GPS comparators 410–412 compare the slip and GPS distance values to corresponding slip and GPS thresholds stored in registers 412–416, respectively. A GPS distance estimate may be deemed reliable if the velocity vector from which it is derived exceeds a threshold value, e.g., 1.5 m/s. Below this value, artificially induced and random fluctuations in the GPS velocity vector make distance estimates derived therefrom inaccurate. A slip signal should, conversely, lie below a threshold level in order for a correction to the odometer conversion parameter to be warranted. If, for example, the vehicle is on ice or accelerating rapidly, a correction to the odometer conversion factor would be inappropriate, since the odometer signal itself contains a large slip related error which may be intermittent in nature.

When slip is below a slip threshold, and the GPS velocity/distance above a GPS threshold, the outputs of both comparators will be positive, thereby closing switch 420 and coupling the output of divider 418 directly to register 404. This provides feedback from signal lines 452–454 which serves to equilibrate the odometer derived distance estimate with the GPS derived distance estimate.

Thus, the conversion parameter is adjusted only during intervals in which confidence in the adjustment of the parameter is high. This increases the reliability of the odometer derived distance estimate during subsequent intervals in which either the GPS is unreliable or slip is unacceptably high.

In the embodiment shown, each of the three signals: slip, odometer and GPS is sampled by sampler 424. In an analog embodiment of the invention the use of the sampler may be avoided.

Figure 5:
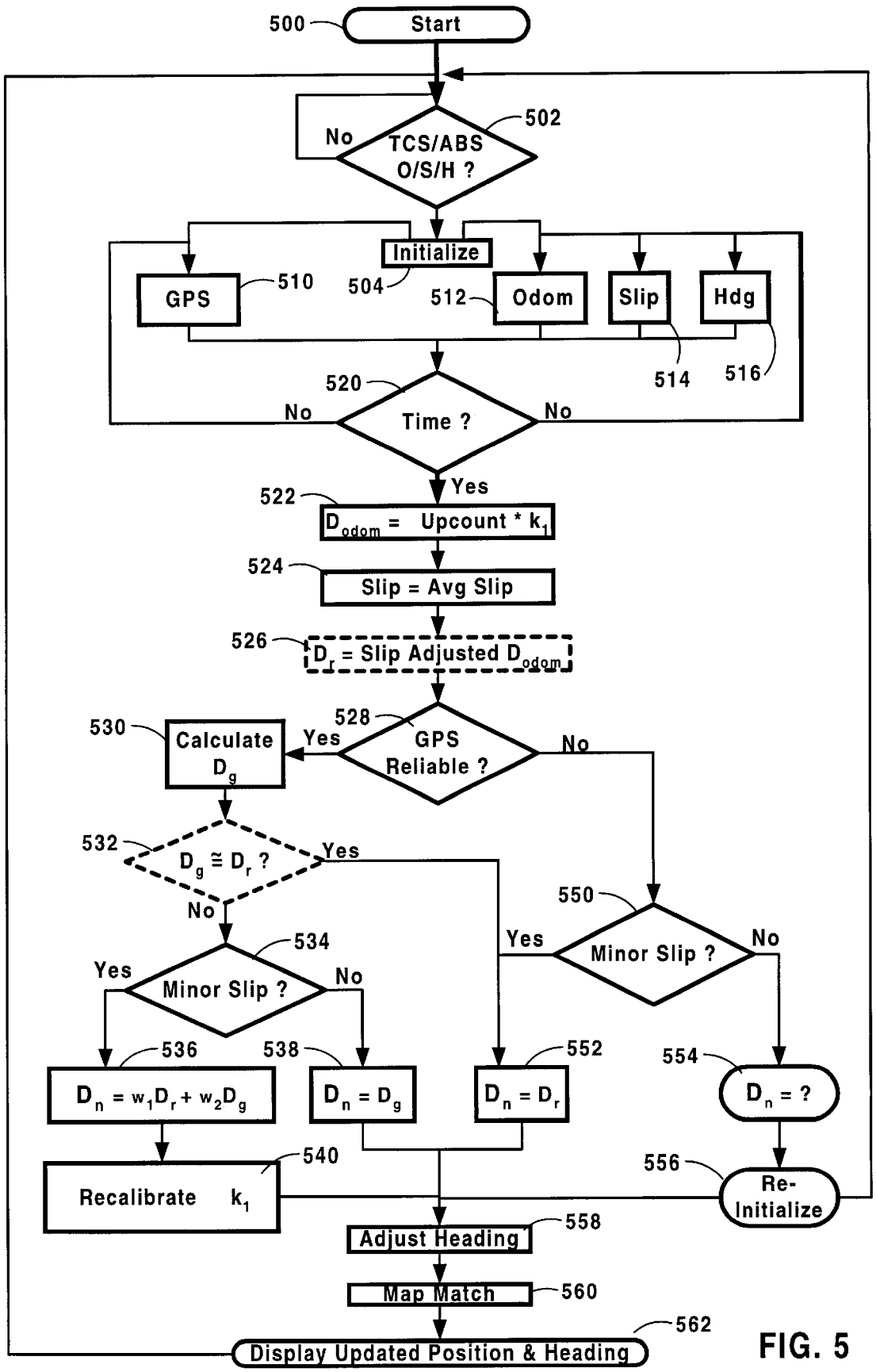
FIGS. 5–6 are process flow diagrams showing distance estimation and recalibration portions of a vehicle navigation system, in accordance with an embodiment of the current invention.
Figure 6:
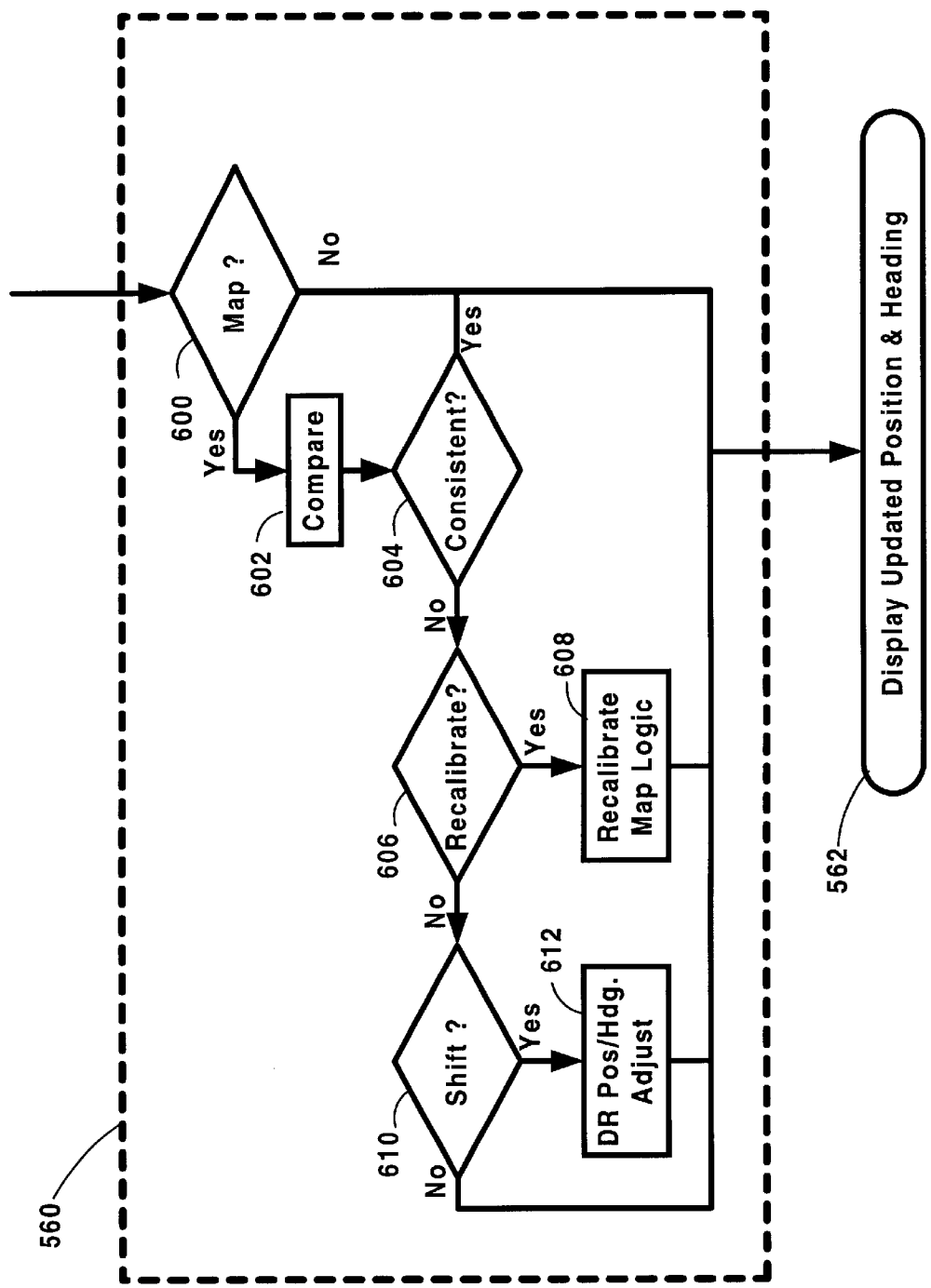

FIGS. 5–6 are process flow diagrams showing the details of the iterative processing associated with distance and heading estimation and distance recalibration in a vehicle navigation system, in accordance with an embodiment of the current invention. Processing begins at start block 500 and proceeds to decision process 502. In decision process 502, a determination is made as to whether the TCS/ABS and whether the dead reckoning sensors, e.g., odometer, slip and heading, are operational. If they are operational, control is passed to process 504. In process 504, all registers are initialized so that a new update to the vehicle's position and heading may be made. Control then passes in parallel to process blocks 510–516. Process 510 handles the obtaining of a GPS signal, e.g., a velocity vector(s). Process 512 handles the obtaining of a dead reckoning distance signal, e.g., odometer pulses. Process 514 handles the obtaining of a dead reckoning slip signal from, for example, an ABS or TCS system onboard the vehicle. Process 516 handles the obtaining of a dead reckoning heading signal from, for example, gyro, an electronic compass. Control then passes to decision process 520. In decision process 520, a determination is made as to whether the time for this particular evaluation interval has elapsed. If it has not, then collection of dead reckoning and GPS signals/data continues. The collection of data may involve filtering, averaging or integrating of data, for example. Odometer signals are typically integrated over time. A slip signal might be averaged over time. Heading and GPS signals may be sampled once per evaluation interval or time averaged.

When the evaluation interval has expired, control passes from decision process 520 to process 522. In process 522 the total accumulated signal from the distance sensor (e.g., a cumulative odometer pulse count over the sample interval) is multiplied by an odometer conversion factor $k_1$ (See FIG. 4, Ref. No. 402–404), in order to obtain the dead reckoning based distance estimate $D_{odom}$ for the time interval. Control then passes to process 524. In process 524 a slip estimate is made for the sampling interval. Slip may, for example, be represented as an average value, e.g., a percent of $D_{odom}$ over the sampling interval. Optionally, control is then passed to process 526. In optional process 526, the dead reckoning distance estimate $D_{odom}$ may be slip adjusted, as discussed above in FIG. 2. Control is then passed to decision process 528.

In decision process 528 a determination is made as to whether, during the sampling interval, a reliable GPS signal has been obtained. That decision may be based on a number of factors, including the availability and reliability of the GPS signal. GPS velocity vectors with a magnitude less than 1.5 m/s may be deemed unreliable. If a determination is made that the GPS signal is not reliable, then control is passed to decision process 550. In decision process 550, a determination is made as to whether to the dead reckoning derived distance estimate may be relied upon. In the embodiment shown, that decision is based on whether or not to the slip of the vehicle lies above or below a threshold level. If slip is major, i.e., lies above a threshold level, then the dead reckoning distance estimate may not be reliable due to slip induced odometer error. Control is then passed to process 554. In process 554, the navigation system implements processes associated with an inability to update the vehicles position, since neither GPS nor dead reckoning can be relied on in the sampling interval. Control is then passed to process 556 for re-initialization of the dead reckoning system. The vehicle position might be updated using an estimate of distance traveled using previous velocity and heading, for example. Control then returns to decision process 502 and the start of the next estimation interval.

Alternately, if in decision process 550 a determination is made that slip is minor, e.g., below an acceptable threshold, then control is passed to process 552. In process 552 the best estimate as to distance traveled by the vehicle during the sampling interval is set equal to the dead reckoning derived distance estimate, with or without slip correction, as discussed above. GPS is not utilized to produce the best estimate since it is not reliable. Control then passes to process 558.

Alternately, if in decision process 528 a determination is made that during the sampling interval GPS is producing reliable data, then control is passed to process 530. In process 530, a GPS derived distance estimate for the sampling interval is obtained. This may involve an integration of the GPS velocity vector, as discussed above in FIG. 4. Control is then passed to optional decision process 532. In decision process 532, a determination is made as to whether the dead reckoning derived distance estimate lies within an acceptable range of the GPS derived distance estimate. If it does, then control is passed to process 552. In process 552, the best estimate of the distance traveled by the vehicle in the sampling interval, e.g., $D_n$, is set equal to the dead reckoning derived distance estimate. This may be appropriate since it avoids unnecessary shifts in the vehicle's position resulting from jumping from one to another of the estimating systems, i.e., GPS and dead reckoning. Control is then passed to process 558.

Conversely, if in decision process 532 it is determined that the GPS and dead reckoning derived distance estimates do not substantially match, then control is passed to decision process 534. In decision process 534, a determination is made as to whether the slip experienced by the vehicle during the sampling interval lies below/above an acceptable level. In event that slip is major, e.g., lies above an acceptable level, control is passed to process 538. In process 538, the best distance estimate during the sampling interval is set equal to the GPS derived distance estimate $D_g$, since the odometer signal contains considerable slip induced inaccuracy. Control is then passed to process 558.

Alternately, if during the sampling interval slip is minor, then control is passed from decision process 534 to process 536. In process 536, the best estimate distance $D_n$ for vehicle travel during the sampling interval is set equal to a weighted sum of the dead reckoning and GPS derived distance estimates, $D_r$ and $D_g$, respectively. Alternately, in another embodiment of the invention, the best estimate distance might again be set equivalent to the GPS derived distance estimate. In either case, control then passes to process 540.

In process 540, the odometer's conversion parameter $k_1$ (See FIG. 4, Ref No. 404) is recalibrated to bring $D_r$ into closer proximity to $D_g$ in subsequent sampling intervals. Recalibration is appropriate, since slip is minor and GPS is reliable, thereby avoiding spurious adjustments to the odometer conversion parameter. By thus limiting the recalibration of the odometer's conversion parameter, the introduction of slip related errors into the odometer conversion parameter are avoided. This is a particular benefit in areas where extended periods of reliable GPS data may occur. Control then passes to process 558.

In process 558, both the GPS and dead reckoning derived heading estimates are calculated, evaluated, and set forth singly or in combination as the best heading estimate for the sampling interval. Criteria similar to those discussed above may be utilized in this determination. Control is then passed to process 560. In process 560 the map matching and map database processes set forth in FIG. 6 are implemented. These may result in further adjustments to the vehicle position and the display in subsequent process 562 of the updated vehicle position and heading to the user. Control then returns to decision process 502 for an evaluation of the vehicle's position and heading during the subsequent sampling interval.

In an embodiment of the invention error correction may be implemented to improve the accuracy of the heading adjustment performed in process 558. Heading information may be obtained by a gyroscope or geomagnetic sensor, for example. In embodiments of the invention which utilize a gyroscope as a dead reckoning sensor, it may be advantageous to provide correction for drift and scale factor. The gyro scale factor and drift are major parameters that affect the accuracy of gyro output and therefore the accuracy of the heading. The gyro scale factor is used to convert the voltage output from the gyro into angular rate. The gyro drift factor characterizes the ability of gyro to reference all rate measurements to a nominal zero point. The zero point drifts due to a variety of environmental factors, temperature being the predominant one. It is very difficult to calibrate the gyro zero point, when the vehicle with navigation system is traveling on a winding road. An ABS/Traction control system module can be used to reduce drift and increase scale factor accuracy. These systems, ABS/Traction control, provide average front/rear wheel speeds as well as the difference between left and right wheel speeds. This difference between left and right wheel speeds for both front and rear wheels contains the information about the vehicle's heading change when the vehicle is traveling on a winding road. Therefore, this information can be utilized in calibration of gyro zero point in winding road driving situation, with a resultant improvement in the heading recalculation performed in process 558.

FIG. 6 is a process flow diagram showing a top-level view of a map matching and map database integrated into the navigation system shown in FIG. 5 to improve the accuracy and functionality of the vehicle navigation system. Processing begins at decision block 600 in which a determination is made as to whether there is a new map reading that meets certain reliability requirements, such as a landmark or a turn. Then the vehicles trajectory is compared using absolute or probabilistic techniques against known roads close to the prior matched position. The road whose shape most closely resembles the current trajectory and previously matched road is selected as the one on which the vehicle is apparently traveling. Where, for example, the map database 324 is providing absolute measurements, (e.g., position/heading, See FIG. 3) those measurements may not be utilized if they lack reliability. In the event the confidence factor in the map matching data is not reliable or not available for the interval of interest, then control is passed directly to process 562. Alternately, where reliable map database information is available, control is passed to process 602. In process 602, the confidence factor for map matching data is compared with data from the combined dead reckoning and GPS hybrid navigation module 400 (See FIG. 3) after any required parameter conversions have been made. Control is then passed to decision process 604. In decision process 604, a determination is made as to whether the map database data is consistent with the dead reckoning and/or GPS derived data. If this determination is in the affirmative, then control is passed directly to process 562. Alternately, if the datum is not consistent, then control is passed to decision process 606. In decision process 606 a determination is made as to whether recalibration of the map database logic is required. If recalibration is required, control is passed to recalibration process 608. In the recalibration process 608 the map matching processes are recalibrated. Control then passes to map database logic process 562.

Alternately, if in decision process 606 a negative determination is reached, i.e., that no recalibration is necessary, then control passes to decision process 610. In decision process 610 a determination is made as to whether the dead reckoning/GPS derived position and heading need to be corrected. If that determination is in the negative, control passes directly to process 562. Alternately, if a determination is made that a shift in the position and heading as determined by the hybrid dead reckoning and GPS logic 400 (See FIG. 4) needs to be made to bring it into line with the momentarily more reliable map matching processes implemented by the map database, then control is passed to process 612. In process 612, the position and heading determined by the hybrid dead reckoning and GPS logic is shifted to the position and heading determined by the map matching/database module. The determination to shift position and heading may be implemented only when certain threshold conditions are met. Where, for example, the data is inconsistent but the amount of inconsistency falls below a certain threshold, no position shift will be made. This avoids presenting a zigzag position determination to the user and the confusion that may produce. Where, however, the error exceeds a certain threshold, control will be passed to process 612. In process 612, the map matching/database determined position and heading will be substituted in place of the dead reckoning determined position and heading, and may be utilized as the base from which further dead reckoning determinations will be made. Control is then passed to process 562. In process 562 the updated position and heading information is displayed to the user via the output communication module 342 (See FIG. 3).

While the invention has been particularly shown and described with reference to specific embodiments thereof, it will be understood by those skilled in the art that the foregoing and other changes in the form and details may be made therein without departing from the spirit or scope of the invention.

What is claimed is:

1. A method for navigating a vehicle comprising the acts of:
    obtaining during a first time interval an odometer indication signal indicative of a distance traveled by the vehicle, a slip indication signal indicative of the slip of the vehicle, and a heading indication signal indicative of the heading of the vehicle;
    converting the odometer indication signal to a first distance estimate;
    determining a position of the vehicle based on a known prior position, the first distance estimate obtained during said act of converting and the heading of the vehicle indications of which are obtained during said first act of obtaining;
    obtaining during the first time interval an external distance estimate for the vehicle from a radio navigation system;
    determining whether the external distance estimate includes indicia of reliability; and
    adjusting an odometer conversion parameter utilized in said act of converting if the external distance estimate includes indicia of reliability as determined in said second act of determining.

2. The method for navigating a vehicle of claim 1, further comprising the acts of:
    correcting an error in the position of the vehicle determined in said first act of determining if the external distance estimate includes indicia of reliability as determined in said second act of determining.

3. The method for navigating a vehicle of claim 1, further comprising the acts of:
    calculating a difference between the adjusted first distance estimate and the external distance estimate; and
    correcting an error in the position of the vehicle determined in said first act of determining if the external distance estimate includes indicia of reliability as determined in said second act of determining and the difference as determined in said act of calculating exceeds a first threshold value.

4. The method for navigating a vehicle of claim 1, wherein the converting act further comprises the act of:

correcting the first distance estimate using data derived from the slip indication signal.

5. The method for navigating a vehicle of claim 4, wherein the adjusting act further comprises:

adjusting an odometer conversion parameter utilized in said act of converting if the external distance estimate includes indicia of reliability as determined in said second act of determining and values representative of the slip indication signal obtained in said first act of obtaining fall below a second threshold value.

6. The method for navigating a vehicle of claim 5, wherein the odometer conversion parameter includes a constant proportionate to a ratio of a distance traveled to the number of rotations indicated by the odometer indication signal.

7. The method for navigating a vehicle of claim 6, wherein the converting act further comprises the act of:

multiplying a value representative of the odometer signal by the constant to form the first distance estimate.

8. The method for navigating a vehicle of claim 1, wherein the radio navigation system includes a global positioning satellite sensor which generates the external distance estimate for the vehicle.

9. The method of claim 1, wherein the first and second obtaining and determining acts, the converting and adjusting acts, are repeated a plurality of times during successive time intervals to track a movement of the vehicle.

10. The method of claim 1, further comprising the act of:

determining a slip difference between a left and a right wheel of the vehicle; and correcting the heading indication signal for the vehicle based on the slip difference calculated in said determining act.

11. A vehicle navigation system comprising:

an odometer generating an odometer indication signal indicative of a distance traveled by the vehicle;

a slip sensor generating a slip indication signal indicative of a slip of the vehicle;

a heading sensor generating a heading indication signal indicative of the heading of the vehicle;

a first logic for converting the odometer indication signal to a first distance estimate utilizing an odometer conversion parameter and for determining a position of the vehicle based on a known prior position, the first distance estimate and the heading of the vehicle indications of which are obtained from said heading sensor;

a radio navigation sensor for receiving radio navigation signals; and a second logic for converting the radio navigation signals to an external distance estimate for the vehicle, for determining whether the external distance estimate includes indicia of reliability; and for adjusting the odometer conversion parameter utilized by said first logic if the external distance estimate includes indicia of reliability.

12. The vehicle navigation system recited in claim 11, wherein the first logic uses data from the slip indication signal to convert the odometer indication signal to a first distance estimate.

* * * * *